United States Patent Office
2,719,167
Patented Sept. 27, 1955

2,719,167
COMPOUNDS CONTAINING PHOSPHORUS AND PROCESS THEREFOR

Paul Schmidt, Therwil, Switzerland, assignor to Ciba Limited, Basel, Switzerland, a Swiss firm No Drawing. Application April 9, 1954,
Serial No. 422,251

Claims priority, application Switzerland April 13, 1953

6 Claims. (Cl. 260—461)

This invention provides a process for making organic compounds containing phosphorus, of the general formula

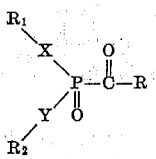

in which R, $R_1$ and $R_2$ represent aliphatic, cycloaliphatic, araliphatic, aromatic or heterocyclic radicals which may contain substituents, and $R_1$ and $R_2$ may form part of a ring system, and X and Y represent —O—, —S—, —NH— or >$NR_1$, wherein one molecular proportion of a compound of the general formula

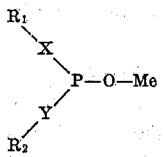

in which $R_1$, $R_2$, X and Y have the meaning given above and Me represents an atom of metal, is reacted with one molecular proportion of a carboxylic acid halide of the general formula Hal—CO—R in which R has the meaning given above, and Hal represents a halogen atom.

When R, $R_1$ or $R_2$ represents an aliphatic radical, such radical may have a straight or branched chain, and may be saturated or unsaturated, and may be substituted or unsubstituted. There may be mentioned, for example, methyl, ethyl, propyl, isopropyl, butyl, hexyl, 2-ethylbutyl, octyl, 2-butyl-octyl, lauryl, octadecyl, allyl or a 2-chlorethyl group; and also radicals containing thiocyanic, cyano or ester groups. The three radicals R, $R_1$ and $R_2$ may be identical or different. When R, $R_1$ or $R_2$ represents an aromatic radical it may be mononuclear or polynuclear and may contain nuclear substituents. There may be mentioned a phenyl, 2- or 4-chlorophenyl, 2:4-dichlorophenyl, 4-nitrophenyl-, 4-methoxyphenyl, naphthyl or 4-diphenyl group. Among the araliphatic radicals, which R, $R_1$ and $R_2$ may represent, there may be mentioned the benzyl group, and among cycloaliphatic radicals the cyclohexyl group, and among heterocyclic radicals the tetrahydrofurfuryl group.

Among the compounds of the formula

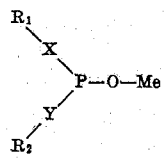

used as starting materials, there are advantageous those in which X and Y represent —O—, as these compounds are easily obtained. They are salts, for example, of dialkyl esters or diaryl esters of phosphorus acid. There are advantageously used alkali salts, such as the sodium salts. There may be mentioned, for example, the sodium salt of diethyl phosphite, of dibutyl phosphite, of diphenyl phosphite or of dibenzyl phosphite. Among the carboxylic acid halides there are advantageously used the acid chlorides, which may belong to a wide variety of different classes of compounds depending on the meaning of the symbol R.

The condensation in accordance with the invention is carried out by reacting the components together in the relative proportions hereinbefore mentioned. They lead to unitary products. Owing to the fact that the reaction is often of an exothermic character it may be necessary to bring the components together while cooling and to dilute them with an inert solvent, such as benzene, toluene, ether, dioxane, hexane or low boiling benzine. The reaction is advantageously finished by heating the mixture at about 40–120° C. If the reaction components are suitably chosen the condensation products can be distilled under reduced pressure.

By using in the present process acid halides of halogen-carboxylic acids, of which the halogen atoms are reactive, there can be obtained compounds of the general formula

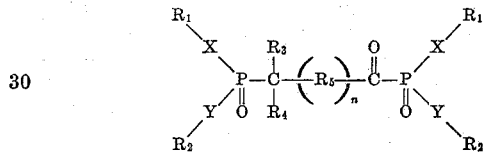

in which R, $R_1$, $R_2$, X and Y have the meanings given above, $R_3$ and $R_4$ represent hydrogen, halogen, or a radical $R_1$, $R_5$ represents a divalent bridge member, and $n$ represents 0 or 1. Compounds of this constitution are obtainable by reacting 1 molecular proportion of a halogen-carboxylic acid halide of the general formula

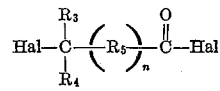

in which $R_3$, $R_4$, $R_5$, Hal and $n$ have the meanings given above, with 2 molecular proportions of a compound of the general formula

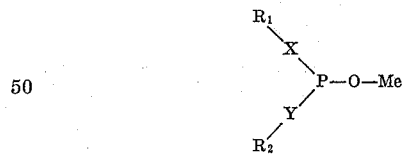

Halogen-carboxylic acid halides suitable for the process are, for example, the chlorides of chlorinated acetic acids, such as chloracetic or trichloracetic acid chloride. When such components are used only one atom of the chlorinated acetic acid enters into reaction. Thus, there is obtained from 1 mol of trichloracetic acid chloride and 2 mols of the sodium salt of diethyl phosphite the condensation products of the formula

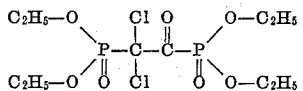

Depending on their constitution the products of the invention are high boiling oils or solid substances. They are useful as intermediate products for a very wide variety of purposes, furthermore, suitably substituted products can be used as additives for lubricants. A few of them are active against animal pests and can therefore be incorporated as active agents in preparations for combatting pests, while others have a general influence on biological processes, for example an inhibiting effect on serum cholinesterase, and can therefore be used in the pharmaceutical field.

The following examples illustrate the invention, the parts being by weight unless otherwise stated and the relationship of parts by weight to parts by volume being the same as that of the kilogram to the liter:

*Example 1*

3.5 parts of sodium are suspended in 400 parts by volume of anhydrous ether, the suspension is mixed with 21 parts of diethyl phosphite. The mixture is allowed to stand for 10 hours at 40° C., and then 42 parts of palmitic acid chloride are added while cooling. The mixture is then heated for 4 hours at 40° C., the precipitated sodium chloride is filtered off, the ether is evaporated, and the residue is distilled. Palmityl diethyl phosphonate of the formula

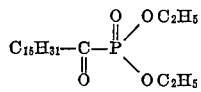

passes over at 174–176° C. under 0.1 mm. pressure in the form of a colorless liquid.

*Example 2*

14 parts of sodium are suspended in 800 parts by volume of anhydrous ether and then 84 parts of diethyl phosphite are introduced dropwise. The mixture is allowed to stand for 10 hours at 40° C., then 50 parts of chloracetyl chloride are added while cooling, and the reaction mixture is allowed to stand at room temperature for 3 hours while stirring. The precipitated salt is filtered off, the solvent is distilled, and the residue is fractionated. Chloracetyl diethyl phosphonate of the formula

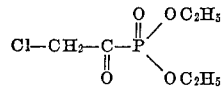

passes over at 108–110° C. under 0.1 mm. pressure and diethyl-phosphon-acetyl-diethyl-phosphonate of the formula

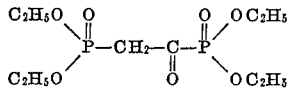

passes over at 128–129° C. under 0.1 mm. pressure. The last named compound shows a strong miotic effect on topical application to the rabbit eye.

*Example 3*

3.15 parts of sodium are suspended in 400 parts by volume of ether, and 19 parts of diethyl phosphite are added to the suspension. The whole is allowed to stand for 10 hours at 40° C., and then 20 parts of dichloracetyl chloride are run in while cooling. After stirring the mixture for 3 hours at room temperature the precipitated salt is filtered off. By distilling the oil which remains behind after evaporating the ether there is obtained at 115–116° C. under 0.14 mm. pressure dichloracetyl-diethyl-phosphonate of the formula

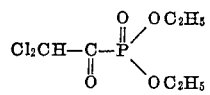

*Example 4*

7 parts of sodium are suspended in 400 parts by volume of anhydrous ether, and 42 parts of diethyl phosphite are introduced dropwise while stirring. The whole is stirred for 10 hours at 40° C., then 27 parts of trichloracetyl chloride are added to the reaction mass, while cooling, the mixture is allowed to stand at room temperature for 6 hours, and the precipitated salt is then filtered off.

By evaporating the ether and distilling the residue at 90° C. under 0.2 mm. pressure there is obtained trichloracetyl-diethyl-phosphonate of the formula

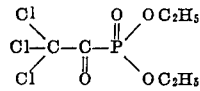

and diethyl phosphon-dichloracetyl-diethylphosphonate of the formula

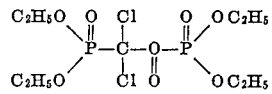

is obtained at 123–124° C. under 0.1 mm. pressure. This compound has a very strong inhibitive action on serum cholinesterase.

What is claimed is:

1. An organic phosphorus-containing compound of the formula

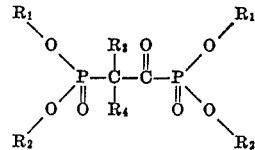

in which $R_1$ and $R_2$ each represents an alkyl radical, and $R_3$ and $R_4$ each represents a member selected from the group consisting of halogen and hydrogen atoms.

2. The compound of the formula

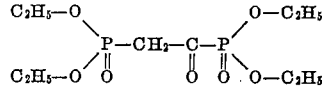

3. The compound of the formula

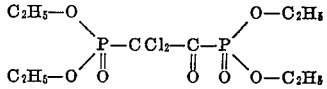

4. A process for the manufacture of an organic compound containing phosphorus of the general formula

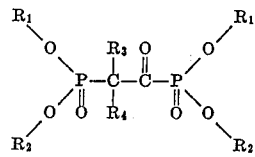

in which $R_1$ and $R_2$ represent alkyl radicals and $R_3$ and $R_4$ each represents a member selected from the group consisting of halogen and hydrogen atoms, which comprises condensing one molecular proportion of a chloroacetic acid chloride with two molecular proportions of an alkali salt of a dialkyl phosphite.

5. A process for the manufacture of the compound of the formula

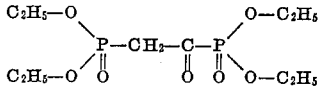

which comprises condensing one molecular proportion of mono chloro-acetic acid chloride with two molecular proportions of sodium diethyl phosphite.

6. A process for the manufacture of the compound of the formula

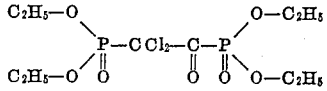

which comprises condensing one molecular proportion of trichloro-acetic acid chloride with two molecular proportions of sodium diethyl phosphite.

References Cited in the file of this patent

UNITED STATES PATENTS 2,629,731    Harman    Feb. 24, 1953